(12) United States Patent
Holden (10) Patent No.: US 11,190,813 B2
(45) Date of Patent: Nov. 30, 2021

(54) SYSTEM, DEVICE AND METHOD FOR TRANSRATING FILE BASED ASSETS

(71) Applicant: Comcast Cable Communications, LLC, Philadelphia, PA (US)

(72) Inventor: Danial E. Holden, Greenwood Village, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 11 days.

(21) Appl. No.: 16/167,681

(22) Filed: Oct. 23, 2018

(65) Prior Publication Data

US 2019/0200052 A1   Jun. 27, 2019

Related U.S. Application Data

(63) Continuation of application No. 15/434,174, filed on Feb. 16, 2017, now Pat. No. 10,142,665, which is a continuation of application No. 14/188,875, filed on Feb. 25, 2014, now Pat. No. 9,609,369, which is a continuation of application No. 12/906,485, filed on Oct. 18, 2010, now Pat. No. 8,711,949.

(51) Int. Cl.
| | |
|---|---|
| *H04N 21/23* | (2011.01) |
| *H04N 21/236* | (2011.01) |
| *H04N 21/2343* | (2011.01) |
| *H04N 21/238* | (2011.01) |

(52) U.S. Cl.
CPC ... *H04N 21/23611* (2013.01); *H04N 21/2343* (2013.01); *H04N 21/23805* (2013.01); *H04N 21/234309* (2013.01)

(58) Field of Classification Search
CPC combination set(s) only.
See application file for complete search history.

(56) References Cited

U.S. PATENT DOCUMENTS

| | | | |
|---|---|---|---|
| 6,771,657 B1* | 8/2004 | Elstermann | H04N 7/52 370/465 |
| 7,027,399 B2 | 4/2006 | Cookman et al. | |
| 7,486,680 B1* | 2/2009 | Zhang | H04N 21/23406 370/395.4 |
| 8,458,362 B2 | 6/2013 | Holden et al. | |
| 2002/0078446 A1* | 6/2002 | Dakss | H04N 21/234318 725/37 |
| 2003/0103532 A1* | 6/2003 | Bertram | H04N 21/23805 370/528 |
| 2004/0073929 A1* | 4/2004 | Morello | H04N 21/6377 725/63 |
| 2004/0139219 A1* | 7/2004 | Radha | H04N 21/234327 709/234 |
| 2004/0213298 A1* | 10/2004 | Sato | H04L 49/90 370/537 |
| 2011/0037904 A1* | 2/2011 | Yokokawa | H04N 21/4345 348/725 |

\* cited by examiner

*Primary Examiner* — Jeffery A Williams
(74) *Attorney, Agent, or Firm* — Banner & Witcoff, Ltd.

(57) ABSTRACT

A video transrater, and a transrater system and method. The transrater system and method may select an optimal bit rate from among a plurality of available bit rates in order to obtain a particular video quality and/or format.

20 Claims, 4 Drawing Sheets

SYSTEM, DEVICE AND METHOD FOR TRANSRATING FILE BASED ASSETS

RELATED APPLICATIONS

This application is a continuation of U.S. patent application Ser. No. 15/434,174, filed Feb. 16, 2017, allowed, which in turn is a continuation of U.S. patent application Ser. No. 14/188,875, filed Feb. 25, 2014, which issued as U.S. Pat. No. 9,609,369 on Mar. 28, 2017, which in turn is a continuation of U.S. patent application Ser. No. 12/906,485, filed Oct. 18, 2010, which issued as U.S. Pat. No. 8,711,949 on Apr. 29, 2014, each of which is hereby incorporated by reference as to its entirety.

FIELD OF THE DISCLOSURE

The disclosure relates to encoding of content for distribution, and, more particularly, to a system, device and method for dynamically electing bitrates and transrating of file based assets.

BACKGROUND

A content distribution network delivers content of a variety of types to users communicatively connected to the content distribution network. The users may connect to the content distribution network such as a wireless, cable, fiber, satellite or a hybrid network via, for example, a networked data receiver, such as a gateway top box (CPE), an end user device, or the like. CPEs for example, are frequently provided to customers of content distribution networks operated by various operators. Distributed content types may include, for example, file based assets, such as video, audio, metadata, and optional interactive TV applications and/or triggers packaged into a file format and/or interactive TV (iTV). As used herein, iTV assets may be, for example, interactive TV applications and/or triggers, and data such as business rules encapsulated with metadata. File based assets may include video-on-demand (VOD) assets, advertising assets, motion video advertisements, still video advertisements, overlay advertisements, or other content.

In a typical content distribution network, a facility may service multiple regional networks, such as converged regional area networks (CRAN). One or more CRANs may service one or more gateway servers, and may additionally service one or more edge servers. Edge servers, or like devices may additionally provide services to gateways, CPEs, and similar devices, and may be referred to as hub servers.

File based assets are typically encoded for distribution and delivery over the content distribution network. The file based assets may be decoded upon receipt, such as by the edge server, or by the gateway, or by the receiving CPE, for example. Typically, distribution networks require encoding at constant bit rates.

Constant bit rate encoding has historically presented several concerns. To address such concerns, for example, file based assets may be "padded," such as using null packets, for encoding. In other words, if the packetization of the file based asset is inadequate in number to account for the constant bit rate set for encoding, additional packets which are blank, or null, may be added in order to provide a sufficient number of packets to account for the constant bit rate. The addition of null packets in order to allow for a particular constant bit rate causes an inability to take advantage, for example of an increase in bit rates, at least in that the increased bits may be devoid of content, and thus may not improve the video quality despite an increased bit rate. On the other hand a constant bit rate may cause a lesser video quality than the file based asset would otherwise allow.

For standard definition VOD, for example, file based assets may be encoded at 3.75 Mb/s. For simple, "talking head" type video content, 3.75 Mb/s is typically a sufficient bit rate to provide an acceptable video quality. In order to achieve a constant bit rate of 3.75 Mb/s, null packets are typically inserted into such content. However, for video content containing fast movement, such as a sporting event like NFL action or highlights, for example, a 3.75 Mb/s bit rate may result in a poor video experience. The poor video experience may suffer further due at least in part to the presence of null packets that were inserted to achieve the desired constant bit rate.

Several solutions have been proposed for video quality issues that arise due to encoding at a constant bit rate, including solutions for constant rate encoding issues with regard to Internet protocol (IP) communications. For typical IP encoding, the initial asset may be decoded from an initial format and played in its entirety, during which time the encoder encodes the asset, in real time, for example, to a new format. Thus, for example, a MPEG video may be "transcoded" into a Flash video by decoding and playing the MPEG video, during which play the MPEG video would be re-encoded to the Flash video format.

As be apparent to those skilled in the art, each of the proposed solutions to the issues presented by constant bit rate encoding has significant drawbacks. For example, transcoding takes significant time, at least in that the asset must be played in full after initial decoding in order to allow for the transcoder to re-encode into a new format and/or bit rate. More recent transcoders break the file into smaller sets, or "chunks", transcode the chunks, and reassemble them so as to reduce the total amount of time for transcoding. Other proposed solutions, such as filling with null packets, increasing bit rate, or initially using variable bit rates, may not provide uniform improvement in video quality, because, for example, such solutions would improve the video quality only of low bit rate content. As such, it would at first seem desirable to simply increase the standard bit rate, such as from 3.75 Mb/s to 7.5 Mb/s. However, such may lead to bandwidth issues and losing distinctions between video quality.

Therefore, a need exists for a system, method and device to provide dynamic encoding, such as changes in bit rates, using a system to change bit rates for file based video assets, wherein the system may select an optimal bit rate from among a plurality of bit rate in order to obtain a particular video quality and/or format.

SUMMARY OF THE DISCLOSURE

The disclosure relates to a video transrater and a transrater system and method. The transrater, system and method may select an optimal bit rate from among a plurality of available bit rates in order to obtain a particular video quality and/or format.

The transrater system may include an incoming asset receiver that receives an incoming asset, such as a video asset, having a first bit rate. The transrater, and a smart media bus that may distribute an optimally encoded incoming asset to at least one destination.

The transrater and transrater system may include functionality, and/or be adapted, to encode at a plurality of available constant bit rates. The transrater may include, be a part of, or be associated with, a business rules engine that may iteratively assess a constant bit rate for encoding correspondent to selection of an optimal video quality for an incoming asset. A business rules engine may include a software system that executes one or more business rules in a runtime production environment. The business rules engine may instruct the transrater to transrate a first bit rate to the one of the plurality of available constant bit rates for encoding correspondent to the optimal video quality, for example.

The transrater, system and method may include the transrater and/or the business rules engine resident at a central location in a content distribution system, such as, for example, at a head end, at an edge server, at a gateway server, or at a QAM hub. The business rules engine may include a hierarchical table of the plurality of available bit rates. The business rules engine may include business rules governing the at least one destination and other variables.

The method may include iteratively encoding an incoming video asset to an increasingly higher bit rate, describing the encoded incoming video asset, such as with metadata, sampling the encoded incoming video asset for an optimal bit rate relation to a video quality of the incoming video asset, setting the increasingly higher bit rate to the optimal bit rate, and updating the metadata to at least identify the incoming video asset and the optimal bit rate. The method may further include distributing the optimally encoded incoming asset.

Thus, the disclosure provides a system, device and method for a transrating of file based video assets, wherein the transrater may select an optimal bit rate from among a plurality of available bit rates in order obtain a particular video quality and/or format.

BRIEF DESCRIPTION OF THE DRAWINGS

Understanding of the disclosure will be facilitated by consideration of the following detailed description, taken in conjunction with the accompanying drawings, in which like numerals refer to like parts and in which.

DETAILED DESCRIPTION

It is to be understood that the figures and descriptions have been simplified to illustrate elements that are relevant for a clear understanding, while eliminating, for the purpose of brevity, many other elements found in typical encoding and decoding devices, systems and methods for communication and transmission of content. Those of ordinary skill in the art will thus recognize that other elements and/or steps are desirable and/or required in implementing the disclosure. However, because such elements and steps are well known in the art, a detailed discussion of such elements and steps may not be provided herein. The disclosure herein is directed to all variations and modification of disclosed elements and methods known to those skilled in the art. Furthermore, the embodiments identified and illustrated herein are for exemplary purposes only, and are not, meant to be exclusive or iced in their description.

As used herein, an encoder is a device, circuit, transducer, software program, and/or algorithm that encodes information from one format, wherein the format may have various variable characteristics such as one or no compression, one or no cryptography, or one bit rate. As used herein, a decoder is a device, circuit, transducer, software program, and/or algorithm that receives and decodes descrambles, decompresses, reformats, or decrypts a received encoded signal. As used herein, transcoding or transrating may include encoding and/or decoding. Transcoding or transrating may include example, converting a media, file or object from one format, one bit rate, one compression, one device type or one cryptography, to another.

Figure 1:
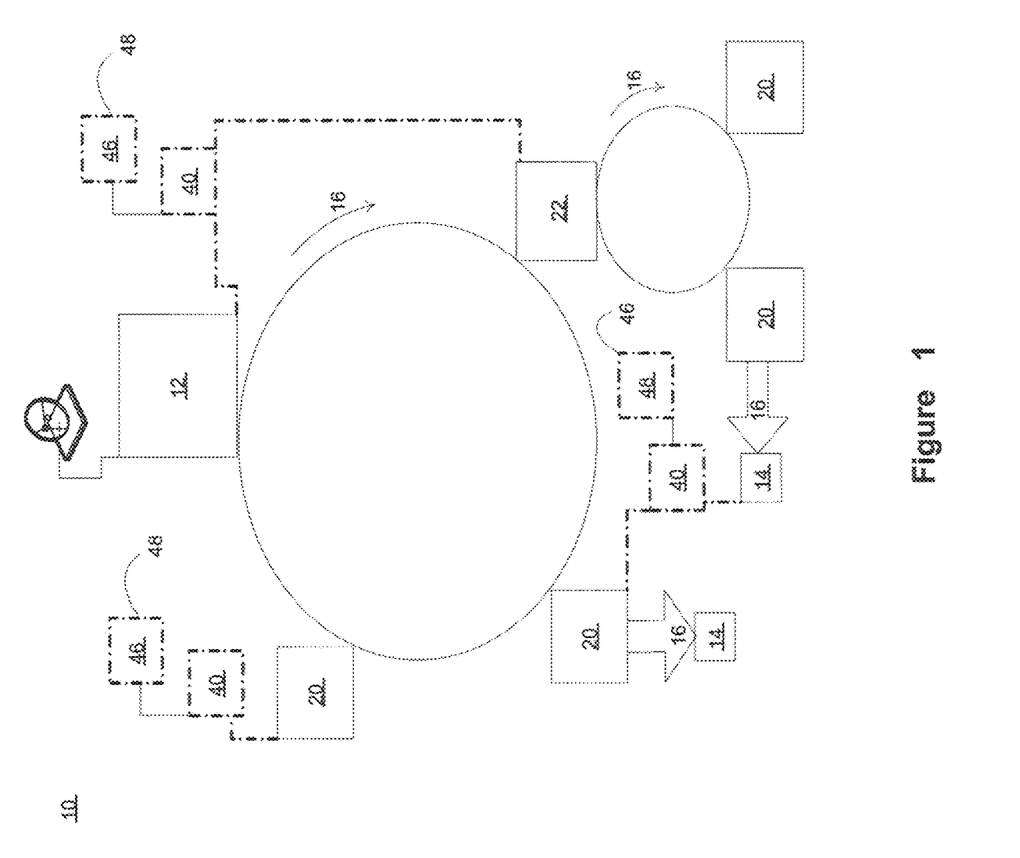
FIG. 1 is a block diagram illustrating an exemplary content distribution network.

In an example content distribution network 10, as illustrated in FIG. 1, a central facility, such as a head end-type facility 12, may remotely service a large group of user devices 14 for receiving content 16. User devices 14 that may receive content 16 include any type of end-user device, such as televisions cell phones, video game machines, computers, or other devices capable of receiving content, such as video, voice, data and other content, directly or indirectly. For example, televisions may receive content directly or via set top boxes (CPE). For simplicity, the disclosure will refer to user devices 14 as CPEs (or consumer premises equipment) but it is to be understood that such devices for receiving content include televisions, gateways or other devices, or by other manner to devices.

The population of CPEs 14 may be simultaneously served regionally or locally by one or more edge servers 20 and/or one or more gateway servers 22. The edge servers 20 may be serviced by the one or more gateway servers 22, for example. Content 16, such as VOD or linear video content, may be transmitted over distribution network 10, either as determined by a provider, or responsive to a request from CPE 14. Frequently, content 16 is cached as locally as possible, such as at edge servers 20 and/or at gateway server 22, in order to optimize bandwidth use and limit the load on central facility 12 of distribution network 10. The content 16 provided may be encoded, and is typically decoded for viewing at one of edge server 20, gateway server 22, or requesting CPE 14. While the disclosure may illustratively refer to VOD or linear content, it is to be understood that examples discussed are applicable to any data or content, and to all types of distribution networks, such as IP distribution networks.

At one or more points, such as at edge servers 20 gateway servers 22, network communication hubs or nodes, or CPEs 14, network 10 may have one or more transcoders 40, which may be associated with one or more business rules engines 46. Transcoder 40 may perform transcoding, as discussed hereinabove and below for example. Business rules engine 46 may store one or more sets of business rules 48. Business rules 48 may be stored electronically, such as in computer-readable medium. An exemplary business rule is an electronic rule, typically embodied in computer code, that, when executed pursuant to the occurrence of one or more predetermined criteria, causes limitation, execution, manipulation, or modification of other code, data, or communication to perform one or more functions in accordance with the subject business rule. By way of example, one or more business rules 48 may assess that a received video is of unacceptable quality, and accordingly may cause to be executed a transcoding by transcoder 40. For example, transcoder 40 may decode the video, re-encode of the video into one or more of multiple available bit rates, and assess, based on the business rules, which of the available bit rates provides the highest video quality. Transcoder 40 may output the video re-encoded at the optimal bit rate for video quality. Business rules engine 46 and business rules 48 may be local to, or remote from, the encoding/transcoding and/or the decoding/transcoding discussed hereinthroughout.

Business rules 48 may be embodied, for example, as extensible markup language (XML) computing code, or in an alternate format and/or computing code type, such as the iLog rules engine. Business rules engine 46, and the software aspects disclosed, may have access to one or more processors associated with one or more data storage mechanisms, such as computing memory, for storing, for example, the usage information and business rules 48 discussed hereinthroughout, and may further include computing code resident on the one or more microprocessors and/or the one or more data storage mechanisms. The computing code, which may be stored on any suitable computer readable-media, when executed by the one or more processors, may cause the implementation of the systems and methods discussed hereinthroughout, for example. Business rules engine 46 may be resident, for example, at one or more of a central facility 12, an edge server 20, a gateway server 22 or a similar communication hub, a CPE 14, or the like, for example.

Figure 2:
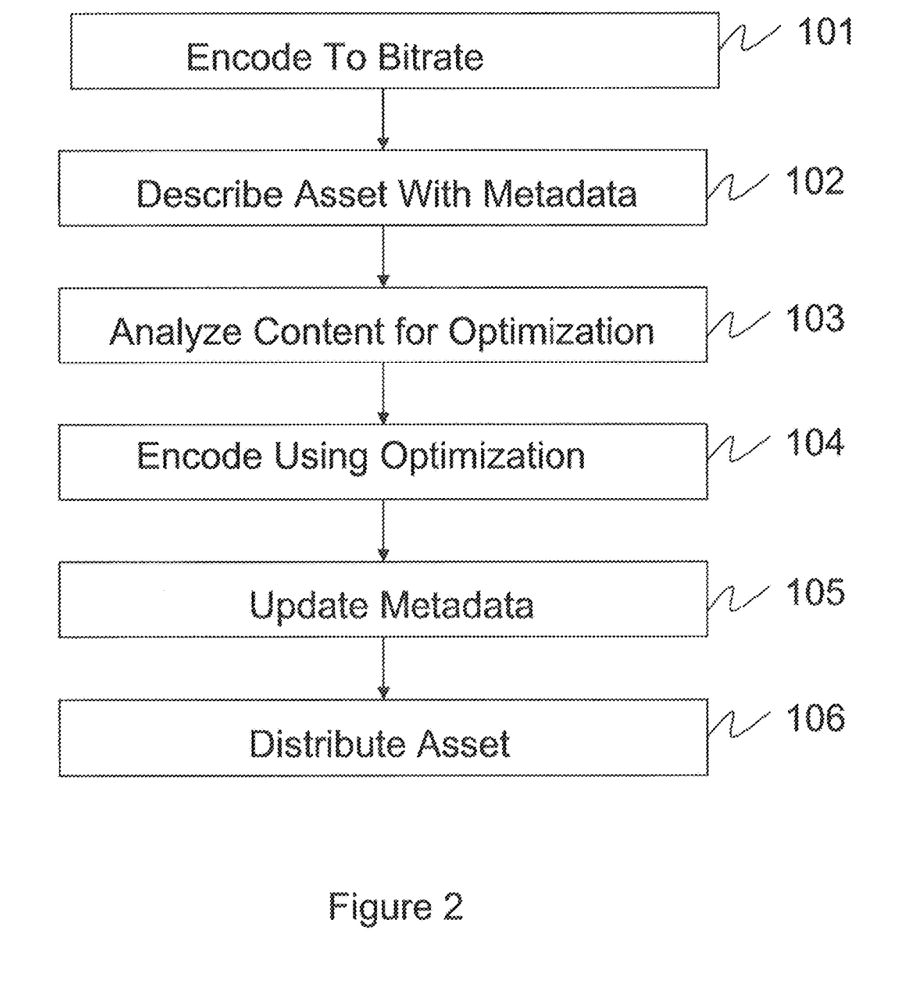
FIG. 2 is a flow diagram illustrating a transrating/transcoding method in accordance with some aspects of the disclosure.

FIG. 2 is a flow diagram illustrating an embodiment of a transrating/transcoding method. Method steps may include, for example, iteratively encoding an asset to an increasingly higher bit rate, describing the encoded asset with metadata, and analyzing via, for example, sampling, the encoded asset for an optimal bit rate in relation to video quality. Steps may also include removing nulls, if required, and setting the encoding bit rate to the optimal bit rate, updating the descriptive metadata to reflect at least an identification of the asset and the optimal encoding bit rate, and distributing the optimally encoded asset. These steps may, in combinations and/or in the aggregate, dynamically reshape an incoming asset into an optimized asset. Optimization, as used herein, may include, for example, improvement in video quality, providing headroom to manipulate and/or piggyback on the underlying asset, providing modifications needed for destination equipment, and the like.

At step 101, video content may be encoded, such as for storage or delivery. The encoding may be an initial encode at an initial bit rate, or a subsequent, iterative encode at a bit rate higher than the initial bit rate. The encoding may be performed on any incoming content, or, in a more particular embodiment, on any video content and/or format. The encoding may be performed by any encoding/transcoding hardware or software known in the art that is capable of encoding/transcoding an inbound file from one bit rate or format to another bit rate or format. The encoder/transcoder may be resident at any node, point, intersite or location in the content distribution system. The encoded/transcoded content may be stored as one or more assets, such as in conjunction with step 104 (discussed below), to be delivered from the storage upon receipt of a request for the content associated with the asset.

At step 102, the asset may be assigned an electronic description, such as a metadata description, of characteristics of the asset and associated video content. The assigned electronic description may include, but not be limited to, an identifier of the asset, an identifier of the associated video content title, an encoding bit rate, and/or a format, for example. An electronic description may be assigned using methodologies known in the art.

At step 103, the file or piece of content may be optimized to determine an optimal bit rate or format for such file (e.g., which may be done is part on the destination device). For example, a number of null packets and/or other criteria indicative of video quality, shape, destination or format, as may be indicated by an electronic description, may be analyzed. For example, as will be understood by one of ordinary skill, null packets are often used to accommodate particular bit rates. More particularly, null packets may be identified for removal, addition or filling in order to provide an optimization, such as an optimized bit rate. Null packets may be identified in received content, such as by demultiplexing the received content and assessing the absence of substantive content in particular frames associated with ones of the null packets. Upon assessment of the presence of null packets, null packets may be at least partially removed to modify a bit rate and/or to create additional headroom for other content, and/or may be filled with reconstructed content packets in order to approximate intermediate frames of video to thereby improve video quality, for example. Similarly, null packets, if not present or if present in insufficient quantity to provide an optimization, such as an optimized bit rate, may be added in order to modify a bit rate, for example. Of note, as discussed above, null packets do not generally improve, aid in fact may deteriorate, video quality.

Also at step 103, based on the number of null packets in the asset, for example, the shape of the asset, and/or the format or destination of the asset, for example, information gained from prior iterations at step 101, and other criteria, the optimal shape, such as the optimal bit rate, for the asset to provide the desired optimized quality, such as a resultant optimized video quality, may be determined. An optimal bit rate may, in light of the aforementioned negative aspects of null packets, be a bit rate that allows for minimization of the insertion of null packets, for example. Step 103 may be performed over the entirety of the asset, or the information indicative of content optimization may be iteratively obtained via sampling of a decoded or partially decoded asset or portions of an asset. Sampling allows for a time savings, a processing savings, and thus, indirectly, a bandwidth savings, over the available art.

At step 104, the file or asset may be re-encoded or re-formatted in view of the optimized parameters determined at step 103. For example, null packets may be removed and/or added, the content reshaped, and/or the format modified, and the asset may be generated based upon encoding/transcoding using the optimization, such as using the optimal bit rate, determined at step 103. The optimization may be provided via modification to the encoding over the whole of the content, or over only a portion of the content, for example. The electronic description may be updated to indicate the new bit rate for the asset, for example, at step 105. At step 106, the asset may be distributed, with its associated electronic description, such as over the distribution network for streaming (or any other type of transmission) to one or more users. The steps discussed hereinabove may be performed in accordance with a plurality of rules programmed to, and dictated from, the business rules engine 46.

Figure 3:
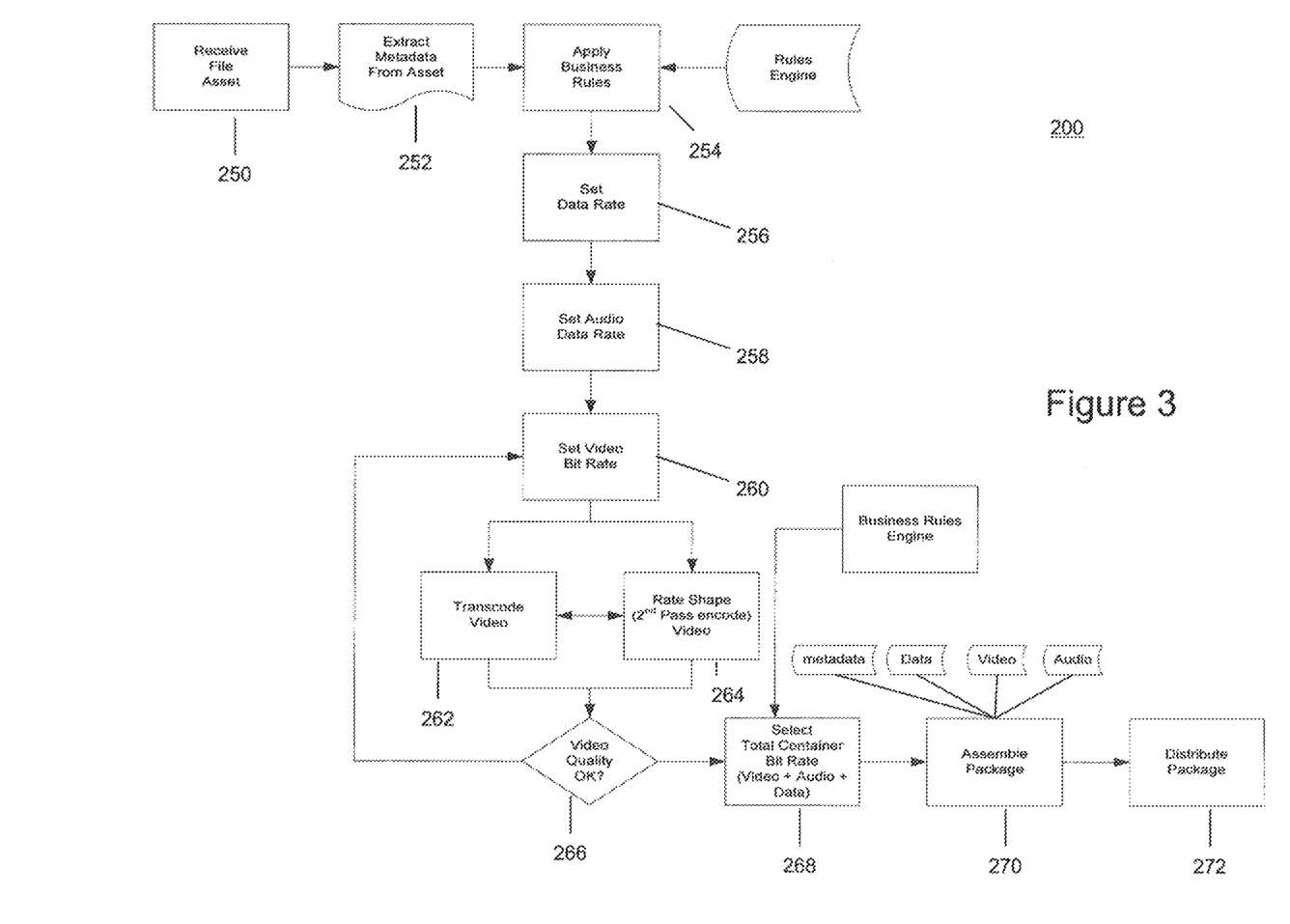
FIG. 3 is a flow diagram illustrating an exemplary transrater process in accordance with some aspects of the disclosure.

FIG. 3 illustrates another exemplary method 200 of transrating/transcoding. At step 250, the transrater system may receive a one or more file assets that may include, for example, data, video, audio, interactive TV applications and associated metadata. At step 252, metadata may be extracted from the file assets. Step 252 may include finding, parsing, and loading received metadata. At step 254, business rules may be applied to enhance the source metadata. Business rules may be stored at business rules engine or elsewhere, as discussed above with respect to FIG. 1. At step 256, a data rate, such as an iTV data rate, may be set to reserve headroom space for data, such EBIF, tru2way, EISS, AIT data, or the like, for example, in the final assembled package. At step 258, the audio bit rate may be set, for example, such that each video asset may have multiple audio tracks (e.g., for foreign language support), multiple audio coders/decoders (CODECs), or the like. The total audio bit rate may be calculated by summing the bit rate of all audio tracks, for example. At step 260, the video bit rate may be set. The original content may be encoded to a higher bit rate than what is minimally required for consumption. This higher bit rate may then be dropped as part of the transcoding process, such as to account for the additional reserved headroom space, and/or other rate shaping technologies may be employed. At step 262, the asset may be transcoded. For example, the CODEC of the video and/or audio may be switched, and the desired bitrate and protocol may be set. Alternatively or in addition, at step 264, the video may be rate shaped, or secondarily encoded, such as to enhance the quality of the video. At step 266, a validation may be performed as to whether the video quality meets expectations. At step 268, a total container bit rate (such as video+audio+data) may be selected to hold the audio, video, and ancillary data. At step 270, the video, audio data, metadata, and other components of the package may be assembled at the selected bit rate, and at step 272, the assembled package may be distributed.

Business rules may be applied for example, steps 252, 254, 256, 258, 260, 262, 264, 266, 268, 270 and 272 and may dictate at least a bit rate assessment for assets, and a bit rate conversion scheme for assets, and may additionally dictate the bit rate steps for the iterations at step 101 as discussed with respect to FIG. 2, for example. Further, application of the business rules may dictate the assessment of, and the optimal criteria or, video quality. For example, the business rules may, in the examples of FIGS. 2 and 3, employ ranking to assess video quality, such as on a quality rating scale of 1 to 10 for video content. The video content may be decoded/transcoded in accordance with one or more business rules. The decoded content may be assessed as to video quality in accordance with a quality rating scale pursuant to one or more business rules, and the decoded content may be reencoded/retranscoded at another bit rate, for example, provided in a table of bit rates for iterative encoding, in an attempt to improve the delivered video quality pursuant to one or more business rules. Application of the business rules may additionally dictate encoding such that null packets are filled or removed, the encoded content is reshaped, reformatted or otherwise modified, and/or an optimal iteration for bit rate is dynamically selected, in the attempt to improve video quality, for example. Application of the business rules may dictate the creation of assets efficiently, such as by utilizing the least number of bits necessary to achieve an optimization of the associated video content.

A provider may distribute content, such as linear video, VOD and/or advertising assets having improved video quality, as illustrated in the exemplary methods shown in FIGS. 2 and 3. Those skilled in the pertinent art will appreciate, in light of the disclosure, that the business rules engine may serve not only a transrating function, wherein a file based asset having a first constant bit rate is converted to a file based asset having a second constant bit rate, for example, but additionally may employ methods as illustrated in FIGS. 2 and 3 to provide a transcoding function, wherein video content is converted from one file format to another, such as, for example, an optimal format.

Figure 4:
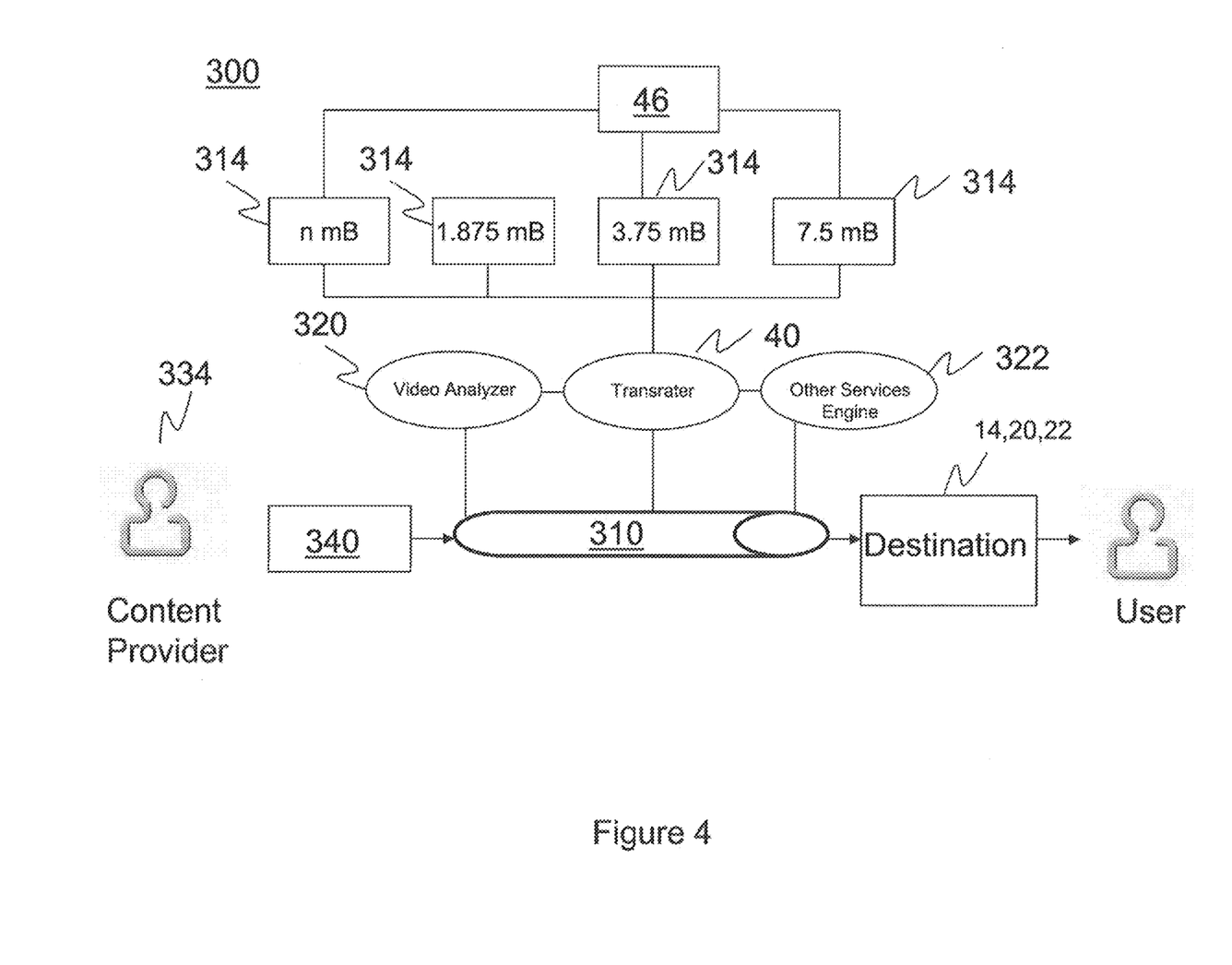
FIG. 4 is a block diagram illustrating a transrater within a transrater system in accordance with some aspects of the disclosure.

FIG. 4 is a block diagram illustrating a system 300 having a transrater 40. System 300 may include a hardware and/or software input 340 for receiving or accessing content having a particular format and/or bit rate, a media bus 310, and a transrater 40. The content may be received from a content provider 334. All or some components may communicate via the media bus 310. The transrater 40 may include a business rules engine 46 that facilitates flow of data to at least one access point 314, in which may be hardware or software, to a plurality of different formats, encoding bit rates, and/or decoding bit rates. By way of non-limiting example, FIG. 4 shows exemplary available inputs of encoding bit rates 1.875 Mb/s, 3.75 Mb/s, and 7.5 Mb/s. Transrater system 300 may additionally include, within or in association with transrater 40, a video content analyzer 320 that, pursuant to one or more business rules in business rules engine 46 for example, may analyze video content in view of electronic description information associated with the content. Transrater system 300 may additionally include, within or in association with transrater 40, miscellaneous other services engine 322, such as checksum error correction and the like. For QAM modulated video, for example, specific quanta, such as multiples of 3.75 Mb/s for total bit rate, may be selected in order to maximize the efficiency of the QAM.

The transrater 40 may, pursuant to the business rules, accept incoming content via hardware or software content input 340, may determine an encoding bit rate of the incoming content, and may transrate the bit rate as necessary, such as to optimize video quality as determined by video analyzer 320. Transrater system 300 may include an input for miscellaneous video services via engine 322, including, for example, adding or removing from the asset packets indicative of intermediate or approximated frames of video content instead of null packets. Content may be input via hardware or software and processed by transrater system 300 to provide, for example, the addition of one or more video quality services to content, either pre-encoding or post-encoding, and typically prior to streaming or otherwise transmitting the file based asset for distribution or storage. Those skilled in the art will appreciate, in light of the disclosure herein, that such intermediate or approximated frames will typically improve video quality, rather than deteriorating quality to accommodate encoding bit rates as is typical with the use of null packets.

Transrater 40 may be configured to allow, for example, inbound assets to transrater system input 340 that are unencoded, decoded, encoded at any number of different constant bit rates, or encoded at variable bit rates. For example, a constant bit rate asset may be received, and business rules engine 46 may dictate an iterative modification of the constant bit rate and sampling of the associated video content to obtain an optimal video quality. Sampling, rather than a full replay to assess and re-encode, may provide a significant time savings, processing savings, and, indirectly, bandwidth savings, over the available art. Additionally, for example, a variable bit rate asset may be received, and business rules may dictate a sampling to assess the insertion of nulls necessary to acquire a particular constant bit rate, which may be dependent on the variable bit rate received, prior to engaging in the iterative process to obtain the optimal constant bit rate. Because transrater 40 may not engage in full conversions between bit rates, languages, or file types, but instead may employ sampling, constant bit rate encoding as dictated by a business rule may readily be accelerated or decelerated based on the sampling.

Media bus 310, which may be a smart media bus, is adapted to provide for interaction of the incoming asset, and/or iterative versions of the incoming asset, at input 340, and for application of electronic description, such as a metadata description, as discussed above. Media bus 310 may be, for example, a media bus of the type known in the art, and one or more of the business rules associated with business rules engine 46 may direct the operation of media bus 310. For example, a metadata electronic description associated with an incoming content may indicate a destination or a modification to a destination, such as CPE 14, edge server 20 and/or gateway server 22, for the outbound optimally encoded content transrater system 300 may then execute the modification in destination, or encode/format the content to conform with destination requirements, in accordance with a business rule.

Transrater 40 is extensible to a plurality of video and data formats and a plurality of video and data delivery mechanisms, and provides a plurality of solutions to improve optimize content. For example, transrater 40 may iteratively reallocate bits in order to optimize content. Likewise the business rules may allow for multidirection encoding, such as wherein a user may encode a video for upload to a different platform, such as a web based platform. In such an embodiment, the business rules applicable to different parties, such as to users in-home, may be static, wherein users are not enabled to modify, upload, or otherwise indicate rules. Nor, in an exemplary embodiment, may users, be enabled to dictate particular qualities or video types. However, in other exemplary embodiments, the business rules may be dynamic as to users and other parties, such as providers 340, and may allow modifications. Business rules may allow the system to be static or dynamic as to all parties, or may be any combination of static or dynamic with respect to different parties.

Particular producers, providers, or owners of content 334 may have particular rules as how their respective content is to be distributed and produced, such as with regard to the required video quality rating of the content as discussed hereinabove. Transrater system 300 may apply business rules to incoming content of any quality from the content producer, provider or owner 334. Upon multiplexing of the business rules with the received content, for example, the quality rating of the content desired for production by a party may be iteratively obtained without need of increased initial quality of the incoming content. Therefore, the use of business rules may eliminate the need for proprietary video formats, encoding and bit rates, for example.

Those of ordinary skill in the art will recognize that many modifications and variations of the disclosure may be implemented without departing from its spirit or scope. Thus, it is intended that the disclosure cover the modifications and variations, provided they come within the scope of the appended claims and their equivalents.

What is claimed is:

1. A method comprising:
   receiving, by a computing device, a content asset that comprises a plurality of substantive packets and at least one null packet, wherein the content asset is configured for transmission at a first bit rate;
   receiving a request for the content asset associated with a second bit rate;
   determining, by the computing device and based on the second bit rate associated with the content asset, at least one replacement packet to replace the at least one null packet, wherein the at least one replacement packet comprises video data that improves video quality of the content asset;
   replacing, by the computing device and in the content asset, the at least one null packet with the at least one replacement packet; and
   sending, by the computing device, the content asset comprising the at least one replacement packet.

2. The method of claim 1, wherein the at least one replacement packet comprises video data that is based on video data in the plurality of substantive packets.

3. The method of claim 1, further comprising:
   creating, by the computing device and based on at least one of the plurality of substantive packets, the at least one replacement packet.

4. The method of claim 1, wherein the determining comprises:
   demultiplexing the received content asset; and
   determining an absence, in at least one frame of the demultiplexed content asset, of substantive content as an indication of a presence of at least one null packet in the content asset.

5. A non-transitory computer-readable medium storing instructions that, when executed, cause:
   receiving a content asset that comprises a plurality of substantive packets and at least one null packet, wherein the content asset is configured for transmission at a first bit rate;
   receiving a request for the content asset associated with a second bit rate;
   determining, based on the second bit rate associated with the content asset, at least one replacement packet to replace the at least one null packet, wherein the at least one replacement packet comprises video data that improves video quality of the content asset;
   replacing, in the content asset, the at least one null packet with at least one replacement packet; and
   sending the content asset comprising the at least one replacement packet.

6. The non-transitory computer-readable medium of claim 5, wherein the at least one replacement packet comprises video data that is based on video data in the plurality of substantive packets.

7. The non-transitory computer-readable medium of claim 5, wherein the instructions, when executed, further cause:
   creating, based on at least one of the plurality of substantive packets, the at least one replacement packet.

8. The non-transitory computer-readable medium of claim 5, wherein the instructions, when executed, further cause:
   demultiplexing the received content asset; and
   determining an absence, in at least one frame of the demultiplexed content asset, of substantive content as an indication of a presence of at least one null packet in the content asset.

9. A system comprising:
   a first apparatus comprising:
      one or more first processors; and
      first memory storing first instructions that, when executed by the one or more first processors, cause the first apparatus to:
         receive a content asset that comprises a plurality of substantive packets and at least one null packet, wherein the content asset is configured for transmission at a first bit rate;
         receive a request for the content asset associated with a second bit rate;

determine, based on the second bit rate associated with the content asset, at least one replacement packet to replace the at least one null packet, wherein the at least one replacement packet comprises video data that improves video quality of the content asset;

replace, in the content asset, the at least one null packet with the at least one replacement packet; and send the content asset comprising the at least one replacement packet; and a second apparatus comprising:

one or more second processors; and second memory storing second instructions that, when executed by the one or more second processors, cause the second apparatus to:

output the content asset comprising the at least one replacement packet.

10. The method of claim 1, further comprising:

removing, based on the second bit rate, one or more additional null packets from the content asset.

11. The method of claim 1, wherein the second bit rate is determined by a user device configured to access the content asset.

12. The method of claim 1, wherein the replacing comprises replacing the at least one null packet with the at least one replacement packet to satisfy a video quality associated with a type of platform used by a user device to access the content asset.

13. The non-transitory computer-readable medium of claim 5, wherein the instructions, when executed, further cause:

removing, based on the second bit rate, one or more additional null packets from the content asset.

14. The non-transitory computer-readable medium of claim 5, wherein the second bit rate is determined by a user device configured to access the content asset.

15. The non-transitory computer-readable medium of claim 5, wherein the replacing comprises replacing the at least one null packet with the at least one replacement packet to satisfy a video quality associated with a type of platform used by a user device to access the content asset.

16. The system of claim 9, wherein the first instructions, when executed by the one or more first processors, further cause the first apparatus to:

create, based on at least one of the plurality of substantive packets, the at least one replacement packet.

17. The system of claim 9, wherein the first instructions, when executed by the one or more first processors, further cause the first apparatus to:

demultiplex the received content asset; and determine an absence, in at least one frame of the demultiplexed content asset, of substantive content as an indication of a presence of at least one null packet in the content asset.

18. The system of claim 9, wherein the first instructions, when executed by the one or more first processors, further cause the first apparatus to:

remove, based on the second bit rate, one or more additional null packets from the content asset.

19. The system of claim 9, wherein the second bit rate is determined by a user device configured to access the content asset.

20. The system of claim 9, wherein the first instructions, when executed by the one or more first processors, cause the first apparatus to:

replace the at least one null packet with the at least one replacement packet by replacing the at least one null packet with the at least one replacement packet to satisfy a video quality associated with a type of platform used by a user device to access the content asset.

\* \* \* \* \*

UNITED STATES PATENT AND TRADEMARK OFFICE
CERTIFICATE OF CORRECTION

| | |
|---|---|
| PATENT NO. | : 11,190,813 B2 |
| APPLICATION NO. | : 16/167681 |
| DATED | : November 30, 2021 |
| INVENTOR(S) | : Holden |

It is certified that error appears in the above-identified patent and that said Letters Patent is hereby corrected as shown below:

In the Specification

Column 1, Field of the Disclosure, Line 20:
Delete "electing" and insert --selecting-- therefor Column 1, Background, Line 28:
After "network", insert --,--

Column 1, Background, Line 30:
After "gateway", insert --set--

Column 1, Background, Line 31:
After "CPEs", insert --,--

Column 1, Background, Line 35:
After "applications", insert --,--

Column 1, Background, Line 48:
After "devices", insert --,--

Column 1, Background, Line 62:
After "packets", insert --,--

Column 1, Background, Line 67:
After "example", insert --,--

Column 2, Background, Line 3:
After "hand", insert --,--

Signed and Sealed this
Thirtieth Day of May, 2023

Katherine Kelly Vidal
*Director of the United States Patent and Trademark Office*

CERTIFICATE OF CORRECTION (continued)
U.S. Pat. No. 11,190,813 B2

Column 2, Background, Line 20:
After "constant", insert --bit--

Column 2, Background, Line 29:
After "As", insert --will--

Column 2, Background, Line 51:
Delete "rate" and insert --rates-- therefor

Column 3, Summary of the Disclosure, Line 24:
After "rate", insert --in--

Column 3, Summary of the Disclosure, Line 33:
After "order", insert --to--

Column 3, Detailed Description, Line 67:
Delete "modification" and insert --modifications-- therefor Column 4, Detailed Description, Line 3:
Delete "not," and insert --not-- therefor Column 4, Detailed Description, Line 4:
Delete "iced" and insert --limited-- therefor Column 4, Detailed Description, Line 11:
After "decodes", insert --,--

Column 4, Detailed Description, Line 14:
After "include", insert --, for--

Column 4, Detailed Description, Line 23:
After "televisions", insert --,--

Column 4, Detailed Description, Line 29:
After "equipment)", insert --,--

Column 4, Detailed Description, Line 50:
After "20", insert --,--

Column 6, Detailed Description, Line 5:
Delete "is" and insert --in-- therefor

Column 6, Detailed Description, Line 27:
Delete "aid" and insert --and-- therefor

CERTIFICATE OF CORRECTION (continued)
U.S. Pat. No. 11,190,813 B2

Column 7, Detailed Description, Line 6:
After "such", insert --as--

Column 7, Detailed Description, Line 28:
After "audio", insert --,--

Column 7, Detailed Description, Line 30:
After "and", insert --,--

Column 7, Detailed Description, Line 32:
After "applied", insert --at,--

Column 7, Detailed Description, Line 33:
After "272", insert --,--

Column 7, Detailed Description, Line 39:
Delete "or," and insert --for,-- therefor Column 9, Detailed Description, Line 15:
After "20", insert --,--

Column 9, Detailed Description, Line 24:
After "Likewise", insert --,--

Column 9, Detailed Description, Line 25:
Delete "multidirection" and insert --multidirectional-- therefor Column 9, Detailed Description, Line 31:
Delete "users," and insert --users-- therefor Column 9, Detailed Description, Line 40:
After "as", insert --to--